Oct. 14, 1930.   O. C. STAPLES   1,778,233
ROD CLAMP
Filed Sept. 27, 1928

Inventor
Oscar C. Staples
By Jack D. Ashley
Attorney

Patented Oct. 14, 1930

1,778,233

UNITED STATES PATENT OFFICE

OSCAR C. STAPLES, OF TULSA, OKLAHOMA

ROD CLAMP

Application filed September 27, 1928. Serial No. 308,690.

This invention relates to new and useful improvements in rod clamps.

One object of the invention is to provide a rod clamp which is easily reversible whereby rods of different diameters may be engaged by said clamp.

A further object of the invention is to provide a clamp including reversible clamping members and single fastening means for securing the clamp when its members are in either of their adjusted positions.

A construction designed to carry out the invention will be hereinafter described, together with other features of the invention.

Figure 1:
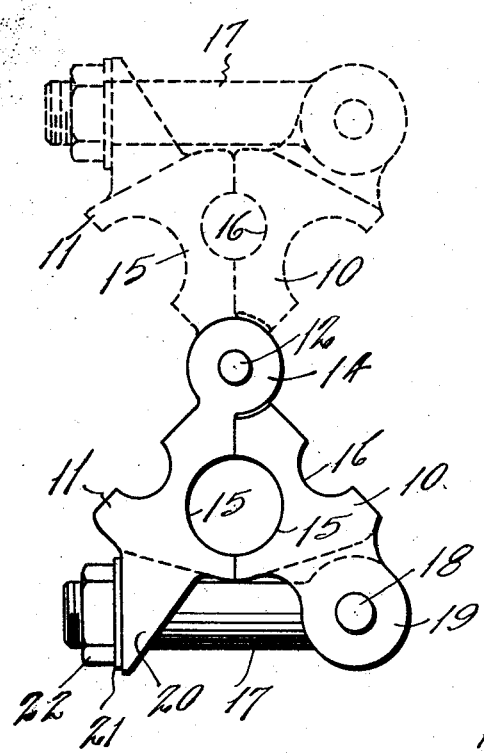
Figure 2:
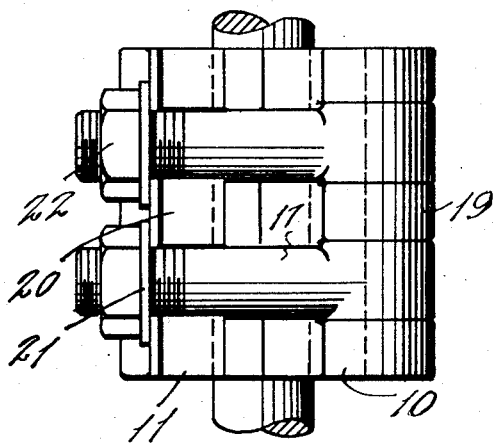
Figure 3:
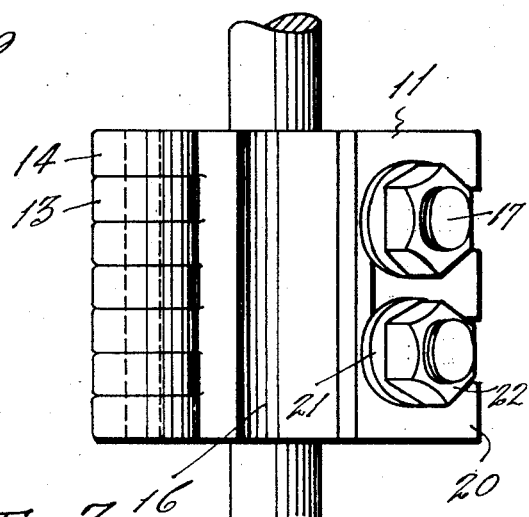

The invention will be more readily understood from a reading of the following specification and by reference to the accompanying drawings, in which an example of the invention is shown, and wherein:

Fig. 1 is a plan view of a clamp constructed in accordance with the invention, one position being shown in full lines and the reversed position in dotted lines, Fig. 2 is a front elevation of the clamp, and Fig. 3 is a side elevation of the same.

In the drawings the numeral 10 designates one member or half-section of the clamp and 11 the other member or half-section thereof. These members constitute sectors radiating from a common center located in a vertical pintle 12 on which the members are hinged. The member 10 has spaced ears 13 intermeshing with ears 14 on the member 11, the pintle penetrating both sets of ears.

By this arrangement the members may be readily swung from the full line to the dotted line position shown in Fig. 1. Owing to the sector shape of the members the sides thereof will match in either position. Each member has a vertical semi-cylindrical recess 15 in one side and these recesses register when the members are swung together as is shown in full lines in Fig. 1.

Each member also has a second vertical semi-cylindrical recess 16 in its opposite side and when the members are swung on the pintle 12 or reversed the recesses 16 will register as is shown in dotted lines in Fig. 1. The recesses 16 having a shorter radius than the recesses 15, a rod of less diameter may be clamped therein, than can be held in the recesses 15. This structure enables the clamp to be adjusted to rods of various sizes.

For holding the members in clamping position and also for causing them to frictionally bind the rod, a pair of eye bolts 17 are hinged on a pintle 18 between lugs 19 on the member 10. These bolts are swung between fingers 20 on the member 11 and receive washers 21 which bear against the flat sides of the fingers and are held by nuts 22.

To place the clamp on a rod the nuts 22 are loosened and the bolts 17 are swung outwardly from the fingers 20, whereby the members 10 and 11 may be swung apart to receive the rod or reversed as is shown in dotted lines in Fig. 1 to receive a smaller rod.

When the rod has been received in either the recesses 15 or 16, the members are swung together and then the bolts 17 are swung between the fingers 20. By tightening the nuts 22 the members 10 and 11 are drawn together and the rod securely clamped therebetween.

Various changes in the size and shape of the different parts, as well as modifications and alterations, may be made within the scope of the appended claims.

What I claim, is:

1. A rod clamp including a pair of members hinged together and each having rod recesses in its opposite sides, each recess of one member being arranged to cooperate with one of the recesses of the other member to form an opening for a rod when the members are swung into gripping relation, and means reversibly mounted upon one member to engage the other member for rigidly fastening the members with either side in gripping relation to clamp a rod therebetween.

2. A rod clamp including a pair of members hinged together, each member having rod recesses in its opposite sides, each recess of one member being arranged to cooperate with one of said recesses in the other member to form an opening for a rod when the members are swung into gripping relation, a bolt hinged to one of the said members and having a nut, and fingers carried by the other member between which said bolt is received and which are engaged by said nut.

3. A rod clamp including a pair of reversible sector shaped members hinged together at their inner ends by a common pintle, each member having rod recesses in its opposite sides, each recess of one member being arranged to cooperate with one of said recesses in the other member to form an opening for a rod, one of said recesses of each member being larger than the other recess, whereby said members may clamp different diameters of rods when reversed, and means for connecting the outer ends of the members for clamping a rod therebetween.

4. A rod clamp as set forth in claim 3, with eye bolts hinged to one of the members, fingers projecting from the front of the other member for receiving the bolts, and nuts on the bolts engaging the fingers for fastening the members together.

5. A rod clamp including a pair of sector shaped members having intermeshing ears at their inner ends hinged on a common pintle, said members having two sides normally in engagement and swingable to bring their opposite sides into engagement, each member having rod recesses in its opposite sides, each recess in the side of one member arranged to cooperate with one of the recesses in the other member to form an opening for a rod, and a bolt hinged to one member and having a nut for fastening the other member, whereby said members may be clamped about a rod.

In testimony whereof I affix my signature.

OSCAR C. STAPLES.